(12) United States Patent
Oono

(10) Patent No.: US 6,337,887 B1
(45) Date of Patent: Jan. 8, 2002

(54) BURST RECEIVING CIRCUIT AND CONTROL METHOD THEREOF

(75) Inventor: Hiroshi Oono, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/252,663

(22) Filed: Feb. 19, 1999

(30) Foreign Application Priority Data

Feb. 19, 1998 (JP) .......................................... 10-052663

(51) Int. Cl.[7] ............................................... H04B 10/06
(52) U.S. Cl. ...................... 375/318; 359/189; 330/260; 330/261
(58) Field of Search ................................ 359/189, 194; 375/316, 317–319, 346; 330/260, 261

(56) References Cited

U.S. PATENT DOCUMENTS 5,822,104 A * 10/1998 Saito ........................... 359/189
5,838,731 A * 11/1998 Nagahori ..................... 375/289
6,115,163 A * 9/2000 Nobuhara .................... 359/189

* cited by examiner

Primary Examiner—Amanda T. Le
(74) Attorney, Agent, or Firm—Young & Thompson

(57) ABSTRACT

A burst receiving circuit and a control method thereof whose unstable state of an output is able to be avoided without bringing about the decrease of the receiving level sensitivity and the deterioration of the output duty are provided. An offset which corresponds to the size of a receiving signal is given to the receiving signal and the offset is made to "0" at the time when the burst signal is received and the burst signal is taken out by shaping the receiving signal given offset based on a predetermined threshold value. And the offset is continued to be "0" until predetermined time has passed after finishing the burst signal. The offset is kept in "0" during the time from the start of the burst signal until predetermined time has passed after the finishing of the burst signal or until the finishing of the burst signal informed by the outside.

10 Claims, 3 Drawing Sheets

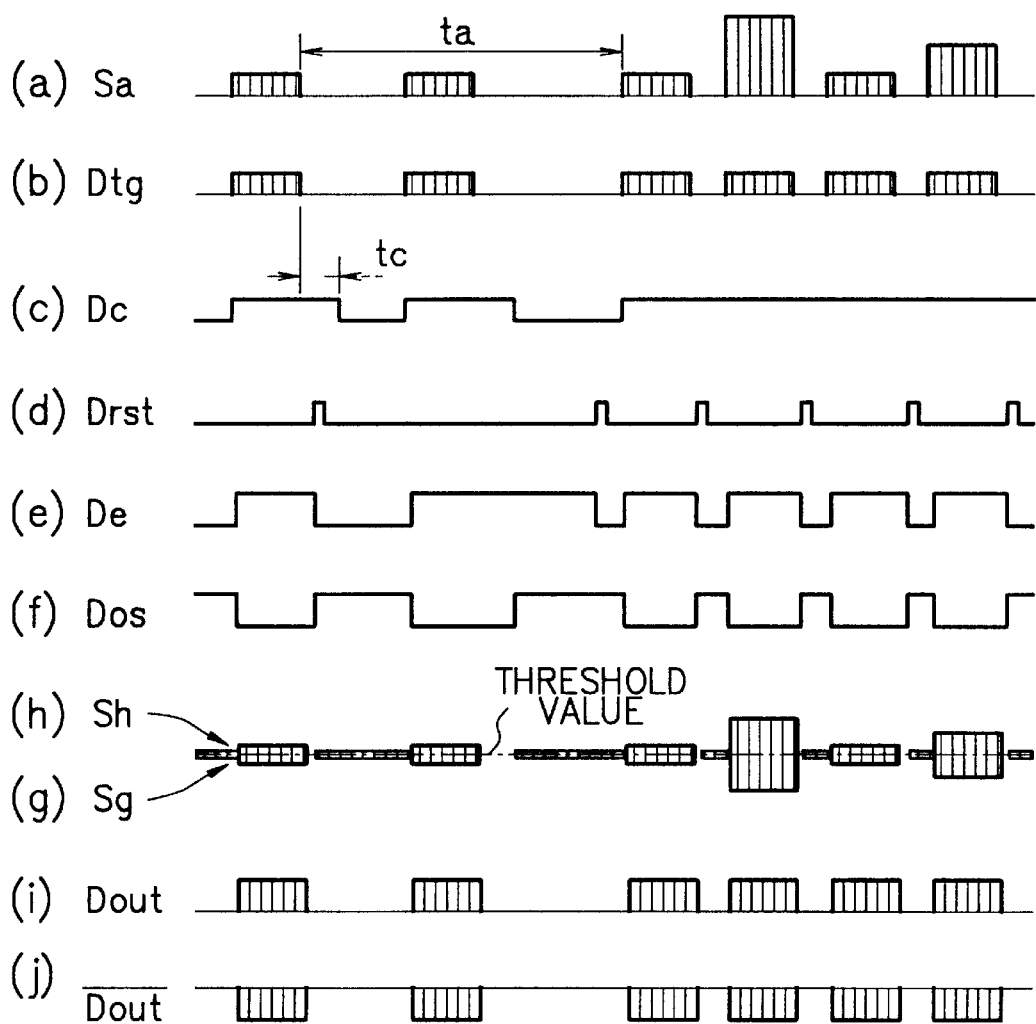

BURST RECEIVING CIRCUIT AND CONTROL METHOD THEREOF

BACKGROUND OF THE INVENTION

The present invention relates to a burst receiving circuit and a control method of the burst receiving circuit applying for data communication apparatuses using the time division multiplex communication and so forth.

DESCRIPTION OF THE RELATED ART

At the conventional burst light receiving circuit of the ATC (automatic threshold control) type, at the time when signals do not exist between bursts, the output becomes unstable, that means, there is no factor to decide either "1" or "0", therefore the output is changed by the fluctuation of small conditions at the inside and outside of the circuit. In order to solve this problem, the offset is applied to the ATC circuit beforehand and this method has avoided the state of the unstable output.

However, this method applying the offset to the ATC circuit has some faults that the receiving level sensitivity becomes low and the deterioration of the output duty occurs and so forth, and the high performance of the burst light receiver has been obstructed.

SUMMARY OF THE INVENTION

It is therefore an object of the present invention to provide a burst receiving circuit and a control method thereof which avoid the unstable state of the output without bringing about the decrease of the receiving level sensitivity and the deterioration of the output duty.

According to a first aspect of the present invention, for achieving the above mentioned objects, a burst receiving circuit provides a control means for giving an offset which corresponds to the size of a receiving signal to said receiving signal, a signal shaping means for taking out a burst signal by shaping said receiving signal given said offset based on a predetermined threshold value and an offset switching means which said control means makes said offset "0" at the time when said burst signal is received.

According to a second aspect of the present invention, a burst receiving circuit provides a detecting means for detecting the start of said burst signal at said receiving signal.

According to a third aspect of the present invention, a burst receiving circuit provides a retriggerable multi vibrator which makes the "0" state of said offset continue until predetermined time passes after the finish of said burst signal.

According to a fourth aspect of the present invention, a burst receiving circuit provides a flip-flop at which an output is raised by the start of said burst signal and said output is fallen by the finish of said burst signal informed from the outside and a NAND circuit which makes the "0" state of said offset continue at the case that the both ouputs of said retriggerable multi vibrator and said flip-flop have been raised.

According to a fifth aspect of the present invention, a burst receiving circuit provides a light receiving element receiving a light signal and amplifiers which convert an electric current flowing in said light receiving element to said receiving signal.

According to a sixth aspect of the present invention, there is provided a control method of a burst receiving circuit, which gives an offset corresponding to the size of a receiving signal to said receiving signal and makes said offset "0" at the time when said burst signal is received, and takes out a burst signal by shaping said receiving signal given said offset based on a predetermined threshold value.

According to a seventh aspect of the present invention, there is provided a control method of a burst receiving circuit, which makes the "0" state of said offset continue until predetermined time passes after the finish of said burst signal.

According to an eighth aspect of the present invention, there is provided a control method of a burst receiving circuit, which makes the state "0" of said offset continue from the start of said burst signal until predetermined time passes after the finish of said burst signal, or until the finish of said burst signal informed from the outside.

At the present invention, to the receiving signal, an offset is given corresponding to the size of the receiving signal and at the time the burst signal is received, the offset becomes "0" And the burst signal is taken out by shaping the receiving signal given offset based on a predetermined threshold value. The offset is continued to be "0" until predetermined time passes after the finish of the burst signal. And from the start of the burst signal until predetermined time passes after the finish of the burst signal or until the finish of the burst signal informed from the outside, the offset is continued to be "0".

BRIEF DESCRIPTION OF THE DRAWINGS

The objects and features of the present invention will become more apparent from the consideration of the following detailed description taken in conjunction with the accompanying drawings in which:

FIG. 3 is a timing chart showing the state of the signals of each section of the embodiment of the present invention.

DESCRIPTION OF THE PREFERRED EMBODIMENTS

Figure 1:
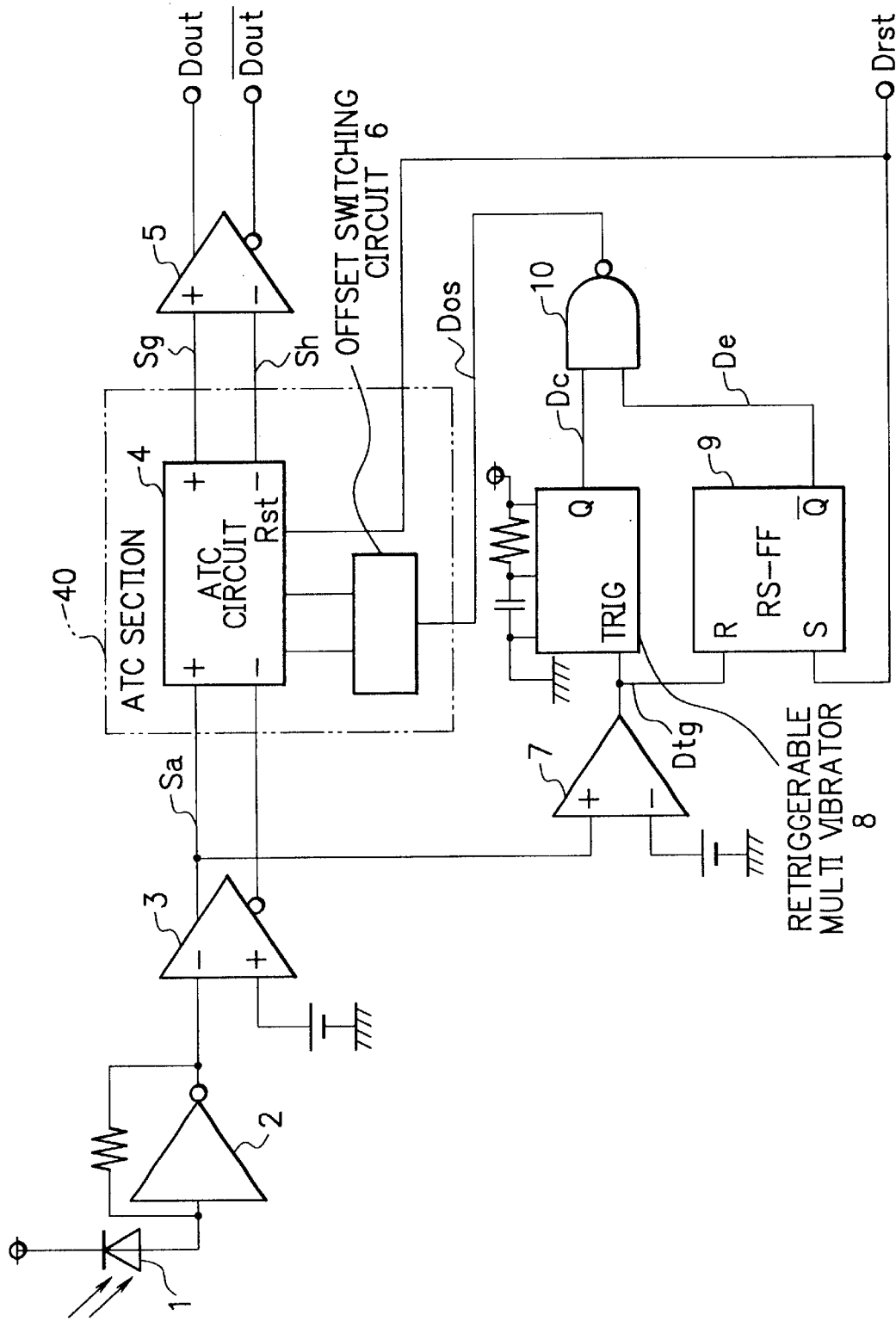
FIG. 1 is a block diagram showing the construction of a burst receiving circuit of an embodiment of the present invention.

Referring now to the drawings, embodiments of the present invention are explained in detail. FIG. 1 is a block diagram showing the construction of a burst receiving circuit of an embodiment of the present invention. In FIG. 1, a photodiode 1 receives light and the cathode of the photodiode 1 is connected to a input terminal of a preamplifier 2. In this embodiment, as the preamplifier 2, a negative feed-backed inverter (logic inversion buffer) is used.

An inverting input terminal of a postamplifier 3 is connected to an output terminal of the preampifier 2. An offset voltage is inputted to a noninverting input terminal of the postamplifier 3.

As this postamplifier 3, for example an operational amplifier (differential amplifier) which has an inverting output terminal and a noninverting output terminal is used and the postamplifier 3 outputs output signals Sa (noninverting side) being inverting phase with each other.

The both output terminals of the postamplifier 3 are connected to corresponding input terminals of an ATC circuit 4 which is a part of an ATC section 4 respectively. A reset signal Drst is inputted to a reset input terminal Rst of the ATC circuit 4. The ATC section 4 provides an offset switching circuit 6 to which an offset switching signal Dos is inputted, in addition to the ATC circuit 4, this offset switching signal Dos is explained later.

A limiter amplifier 5 is connected to the ATC circuit 4. The noninverting input terminal and inverting input terminal of this limiter amplifier 5 are connected to the corresponding terminals of the ATC circuit 4 respectively. The limiter amplifier 5 has the same structure as the above mentioned postamplifier 3, and outputs an output signal Dout and an output signal 1/Dout being inverting phases with each other, hereinafter "1" means an inversion or an inverting phase. This limiter amplifier amplifies the inputted signal to a predetermined logic level and outputs, however the threshold value is set to the middle electric potential of differential input signal.

A comparator 7 is constituted of an operational amplifier and so forth and the signal Sa is inputted to a noninverting input terminal of the comparator 7. A signal Dtg outputted from an output terminal of the comparator 7 is inputted to a trigger input terminal TRIG of a retriggerable multi vibrator 8 and a reset terminal R of a RS (reset/set)-FF (flip-flop) 9. The above mentioned reset signal Drst is inputted to a set terminal S of the RS-FF 9.

A signal Dc outputted from an output terminal Q of the retriggerable multi vibrator 8 and a signal De outputted from an inverting input terminal 1/Q of the RS-FF 9 are inputted to each corresponding input terminal of a NAND gate 1. The offset switching signal Dos is outputted from an output terminal of the NAND gate 1 and this outputted offset switching signal Dos is supplied to the above mentioned offset switching circuit 6.

Figure 2:
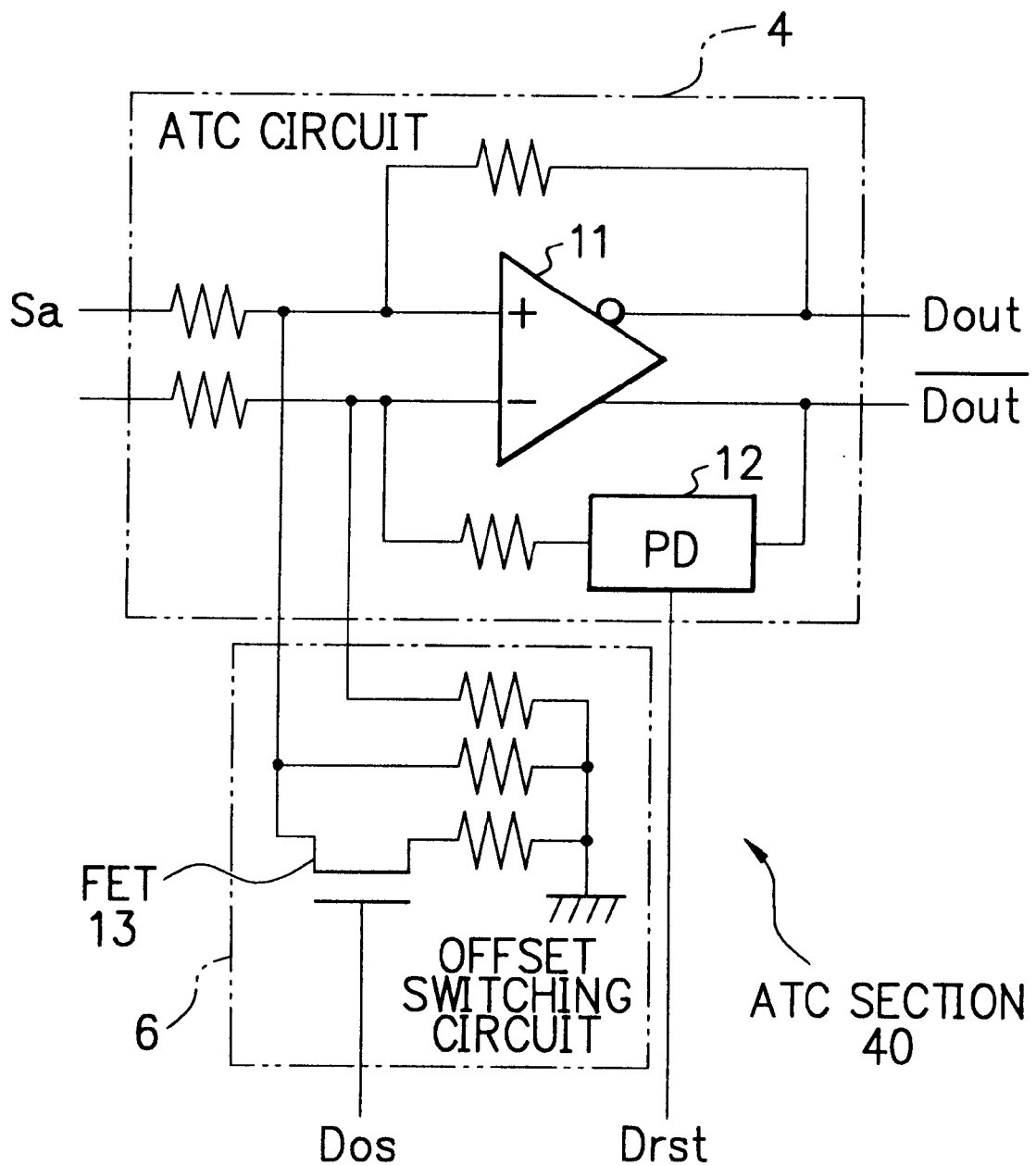
FIG. 2 is a circuit diagram showing the construction of an ATC section in detail.

FIG. 2 is a circuit diagram showing the construction of the ATC section 4 in detail. As mentioned above, the ATC section 4 is constituted of the ATC circuit 4 and the offset switching circuit 6. As shown in FIG. 2, the offset switching circuit 6 is constituted of a MOS type FET 13 being a switch and other components. The offset switching signal Dos is inputted to a gate electrode of the FET 13.

The ATC circuit 4 is constituted of an ATC amplifier 11, a PD (peak detector) 12 and other components. This ATC amplifier 11 has a similar constitution to the above mentioned postamplifier 3 or the limiter amplifier 5. An output from an inverting output terminal of the ATC amplifier 11 is feedbacked to a noninverting input terminal of the ATC amplifier 11 via a resistor. And an output from a noninverting output terminal of the ATC amplifier 11 is feedbacked to an inverting input terminal of the ATC amplifier 11 via the PD 12 connected to this noninverting output terminal and a resistor in series. This PD 12 is reset by the above mentioned reset signal Drst.

The inverting input terminal and noninverting input terminal of the ATC amplifier 11 are grounded via each corresponding resistor, moreover the noninverting input terminal is grounded via a resistor and the above mentioned FET 13 connected in series. By the FET 13 becomes on, the electric potential of the noninverting input terminal of the ATC amplifier 11 is decreased and an offset occurs at the output signal of the ATC amplifier 11.

At the ATC circuit 4, the PD 12 must be discharged after the burst receiving data have not existed. Therefore, the discharge is implemented by the reset signal Drst inputted from the outside.

At the case that the offset is not given to the ATC circuit 4, the signals Sg and Sh outputted from the ATC circuit 4 become the same electric potential at the time when signals do not exist after the reset and become the same value as the threshold value of the limiter amplifier 5. Therefore, at the limiter amplifier 5, the noise at the no signals is amplified, with this effect, the output signals Dout and 1/Dout become unstable.

In the embodiment of the present invention, at the time of the burst receiving, the offset is made to "0", and after finishing the burst, the offset is given again, with this, the state that the output of the limiter amplifier 5 becomes unstable is avoided.

FIG. 3 is a timing chart showing the state of the signals of each section of the embodiment of the present invention. At the embodiment of the present invention, the output signal Sa of the postamplifier 3 is inputted to the comparator 7 and whether the burst data exist or not is judged. The output signal Sa is shown in FIG. 3(a).

The judged result signal Dtg by the comparator 7 is inputted to the trigger input terminal TRIG of the retriggerable multi vibrator 8 and the reset terminal R of the RS-FF 9. The signal Dtg is shown in FIG. 3 (b).

In the retriggerable multi vibrator 8, at the time when the inputted signal Dtg rises, the outputting signal Dc from the output terminal Q becomes "1" and after this signal Dtg rises, for predetermined holding time "tc", the signal Dc keeps "1". The signal Dc is shown in FIG. 3(c).

This holding time "tc" is determined by a capacitor C and a resistor R connected to the retriggerable multi vibrator 8 shown in FIG. 1. However this holding time "tc" is set to a little shorter time than the discharging time of the PD 12 shown in FIG. 2. This comes from the consideration that the ATC circuit 4 is automatically reset after the discharging of the PD 12 at a distance measuring region "ta" of PON (passive optical network), "ta" is shown in FIG. 3(a).

To the RS-FF 9, the reset signal Drst and the signal Dtg outputted from the comparator 7 are inputted (FIGS. 3(d) and 3(b)). Therefore, the signal De outputted from the inverting output terminal 1/Q of the RS-FF 9 becomes "1" at the interval from the rising of the signal Dtg to the rising of the reset signal Drst as shown in FIG. 3(e).

The signals De and Dc are inputted to the NAND gate 10 and the offset switching signal Dos being the inverting value of these AND is outputted (FIG. 3(f)). This offset switching signal Dos becomes "1" at the no signal time after the reset and at the no signal time after the spontaneous discharge of the PD 12 at the distance measuring region "ta" and at this time the offset is given to the ATC circuit 4.

With this, the output signals Dout and 1/Dout outputted from the limiter amplifier 5 do not become unstable at the no signal time of the input and the receiving sensitivity is increased inside the burst and the duty is improved.

As explained above, according to the present invention, the offset which corresponds to the size of the receiving signal is given to the receiving signal and the offset is made to "0" at the time of the burst signal is received and the burst signal is taken out by shaping the receiving signal given the offset based on a predetermined threshold value. And the offset is continued to be "0" until predetermined time has passed after finishing the burst signal. The offset is kept in "0" during the time from the start of the burst signal until predetermined time has passed after the finish of the burst signal or until the finish of the burst signal informed by the outside. Therefore that the burst receiving circuit and its controlling method whose unstable state of the output is able to be avoided without having the decreasing of the receiving level sensitivity and the deterioration of the output duty are able to be realized.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A burst receiving circuit, comprising:
a control means for giving an offset which corresponds to the size of a receiving signal to said receiving signal;
a signal shaping means for taking out a burst signal by shaping said receiving signal given said offset based on a predetermined threshold value; and
an offset switching means which said control means makes said offset "0" at the time when said burst signal is received.

2. A burst receiving circuit in accordance with claim 1, comprising:
a detecting means for detecting the start of said burst signal at said receiving signal.

3. A burst receiving circuit in accordance with claim 1, comprising:
a retriggerable multi vibrator which makes the "0" state of said offset continue until predetermined time passes after the finish of said burst signal.

4. A burst receiving circuit in accordance with claim 2, comprising:
a retriggerable multi vibrator which makes the "0" state of said offset continue until predetermined time passes after the finish of said burst signal.

5. A burst receiving circuit in accordance with claim 3, comprising:
a flip-flop at which an output is raised by the start of said burst signal and said output is fallen by the finish of said burst signal informed from the outside; and
a NAND circuit which makes the "0" state of said offset continue at the case that both outputs of said retriggerable multi vibrator and said flip-flop have been raised.

6. A burst receiving circuit in accordance with claim 5, comprising:
a light receiving element receiving a light signal; and
amplifiers which convert an electric current flowing in said light receiving element to said receiving signal.

7. A burst receiving circuit in accordance with claim 1, comprising:
a light receiving element receiving a light signal; and
amplifiers which convert an electric current flowing in said light receiving element to said receiving signal.

8. A control method of a burst receiving circuit, which comprises giving an offset corresponding to the size of a receiving signal to said receiving signal, making said offset "0" at the time when said burst signal is received, and taking out a burst signal by shaping said receiving signal given said offset based on a predetermined threshold value.

9. A control method of a burst receiving circuit in accordance with claim 8, comprising making the "0" state of said offset continue until a predetermined time passes after the finish of said burst signal.

10. A control method of a burst receiving circuit in accordance with claim 8, comprising making the state "0" of said offset continue from the start of said burst signal until a predetermined time passes after the finish of said burst signal, or until the finish of said burst signal informed from the outside.

* * * * *